US011176626B1

(12) United States Patent  
Ismael et al.

(10) Patent No.: US 11,176,626 B1  
(45) Date of Patent: Nov. 16, 2021

(54) PERSONALIZING FOOD DISCOVERY AND SEARCH BASED ON INFERRED TASTE PREFERENCE

(71) Applicant: GRUBHUB HOLDINGS, INC., Chicago, IL (US)

(72) Inventors: Maryam Ismael, New York City, NY (US); Parin Choganwala, New York City, NY (US); Shahab Yunus, New York City, NY (US); Arthi Murugesan, New York City, NY (US)

(73) Assignee: GRUBHUB HOLDINGS, INC., Chicago, IL (US)

( * ) Notice: Subject to any disclaimer, the term of this patent is extended or adjusted under 35 U.S.C. 154(b) by 509 days.

(21) Appl. No.: 16/013,799

(22) Filed: Jun. 20, 2018

(51) Int. Cl.

| | |
|---|---|
| *G06Q 50/12* | (2012.01) |
| *G06Q 30/06* | (2012.01) |
| *G06N 5/04* | (2006.01) |
| *G06F 16/248* | (2019.01) |
| *G06Q 30/02* | (2012.01) |

(52) U.S. Cl.
CPC .......... *G06Q 50/12* (2013.01); *G06F 16/248* (2019.01); *G06N 5/047* (2013.01); *G06Q 30/0631* (2013.01); *G06Q 30/0633* (2013.01); *G06Q 30/0282* (2013.01)

(58) Field of Classification Search
CPC ............... G06Q 50/12; G06Q 30/0631; G06Q 30/0633; G06Q 30/0282; G06F 16/248; G06N 5/047

See application file for complete search history.

(56) References Cited

U.S. PATENT DOCUMENTS

| | | | |
|---|---|---|---|
| 9,396,492 B2 * | 7/2016 | Schiff | G06Q 30/06 |
| 2012/0095862 A1 * | 4/2012 | Schiff | G06Q 30/0282 705/26.7 |
| 2013/0006802 A1 * | 1/2013 | Dillahunt | G06Q 30/0261 705/26.7 |
| 2013/0222406 A1 * | 8/2013 | Wolfe | H04L 67/02 345/582 |
| 2014/0032453 A1 * | 1/2014 | Eustice | G06F 16/955 706/12 |
| 2014/0052681 A1 * | 2/2014 | Nitz | H04L 51/02 706/46 |
| 2014/0257930 A1 * | 9/2014 | Lehmann | G06Q 30/0203 705/7.32 |
| 2014/0258270 A1 * | 9/2014 | Reese | G06F 16/9535 707/722 |

(Continued)

OTHER PUBLICATIONS

T. Osman, M. Mahjabeen, S. S. Psyche, A. I. Urmi, J. M. S. Ferdous and R. M. Rahman, "Adaptive food suggestion engine by fuzzy logic," 2016 IEEE/ACIS 15th International Conference on Computer and Information Science (ICIS), Okayama, 2016, pp. 1-6, doi: 10.1109/ICIS.2016.7550755. (Year: 2016).*

(Continued)

*Primary Examiner* — Peter Ludwig
*Assistant Examiner* — Michael Jared Walker
(74) *Attorney, Agent, or Firm* — Baker Botts L.L.P.

(57) ABSTRACT

The disclosed technologies can compute inferred taste preferences relating to food products and food providers using objectively verifiable data, including order data, and use these inferred taste preferences to create new functionality in an information search and retrieval system and/or a product ordering system.

29 Claims, 8 Drawing Sheets

(56) References Cited

U.S. PATENT DOCUMENTS

| | | | | |
|---|---|---|---|---|
| 2015/0220592 | A1* | 8/2015 | Robberechts | G09B 19/0092 |
| | | | | 715/810 |
| 2016/0055236 | A1* | 2/2016 | Frank | G06Q 30/02 |
| | | | | 707/748 |
| 2016/0063734 | A1* | 3/2016 | Divakaran | G06K 9/4642 |
| | | | | 382/110 |
| 2016/0180311 | A1* | 6/2016 | Tung | G06Q 50/12 |
| | | | | 705/15 |
| 2016/0232624 | A1* | 8/2016 | Goldberg | G06Q 30/02 |
| 2017/0032477 | A1* | 2/2017 | Kamen | G06Q 50/12 |
| 2017/0068982 | A1* | 3/2017 | Vangala | G06Q 50/12 |
| 2018/0018592 | A1* | 1/2018 | Bhattacharyya | G06Q 10/02 |
| 2018/0025010 | A1* | 1/2018 | Ramer | G06F 16/7867 |
| | | | | 707/727 |
| 2018/0025386 | A1* | 1/2018 | Lee | G16H 40/67 |
| | | | | 705/14.66 |

OTHER PUBLICATIONS

N. Koubai, F. M. Bouyakoub, M. S. Halilali and I. M. A. Medad, "Toward a smart restaurant with context management," Smart Cities Symposium 2018, Bahrain, 2018, pp. 1-6, doi: 10.1049/cp.2018.1417. (Year: 2018).*

* cited by examiner

Acct ID: 1234 — 180

| Loc'n | Date/Time | Activity | Content Description |
|---|---|---|---|
| NYC | ttttddmmyy1 | view | Asian Express |
| NYC | ttttddmmyy2 | order | tofu pad thai |
| NJ | ttttddmmyy3 | order | margherita pizza |
| CA | ttttddmmyy4 | click | Veggie Grill |

FIG. 1A

PERSONALIZING FOOD DISCOVERY AND SEARCH BASED ON INFERRED TASTE PREFERENCE

TECHNICAL FIELD

The present disclosure relates to computer-implemented information and retrieval systems and relates more particularly to food product ordering systems with information search and retrieval capabilities.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

Computer-implemented food product ordering systems often provide or communicate with an information search and retrieval interface. The search and retrieval interface is used for searching and browsing information that depicts or describes food providers and/or items of food that are available for purchase. Examples of food providers include restaurants, grocery stores, and food delivery services. Examples of food items include made-to-order meals, packaged meals, and grocery items. The search and retrieval interface communicates on a network with an electronic transaction processing system to effectuate online ordering and purchases of food items that are selected in the interface.

Some food product ordering systems include or communicate on a network with computer-implemented delivery systems to arrange for delivery of the ordered food items to geographic locations that may be specified in or associated with the electronic food orders.

SUMMARY

The appended claims may serve as a summary of the present invention.

BRIEF DESCRIPTION OF THE DRAWINGS

FIG. 1A is an example plot of user interaction data including food order data.

Figure 1B:
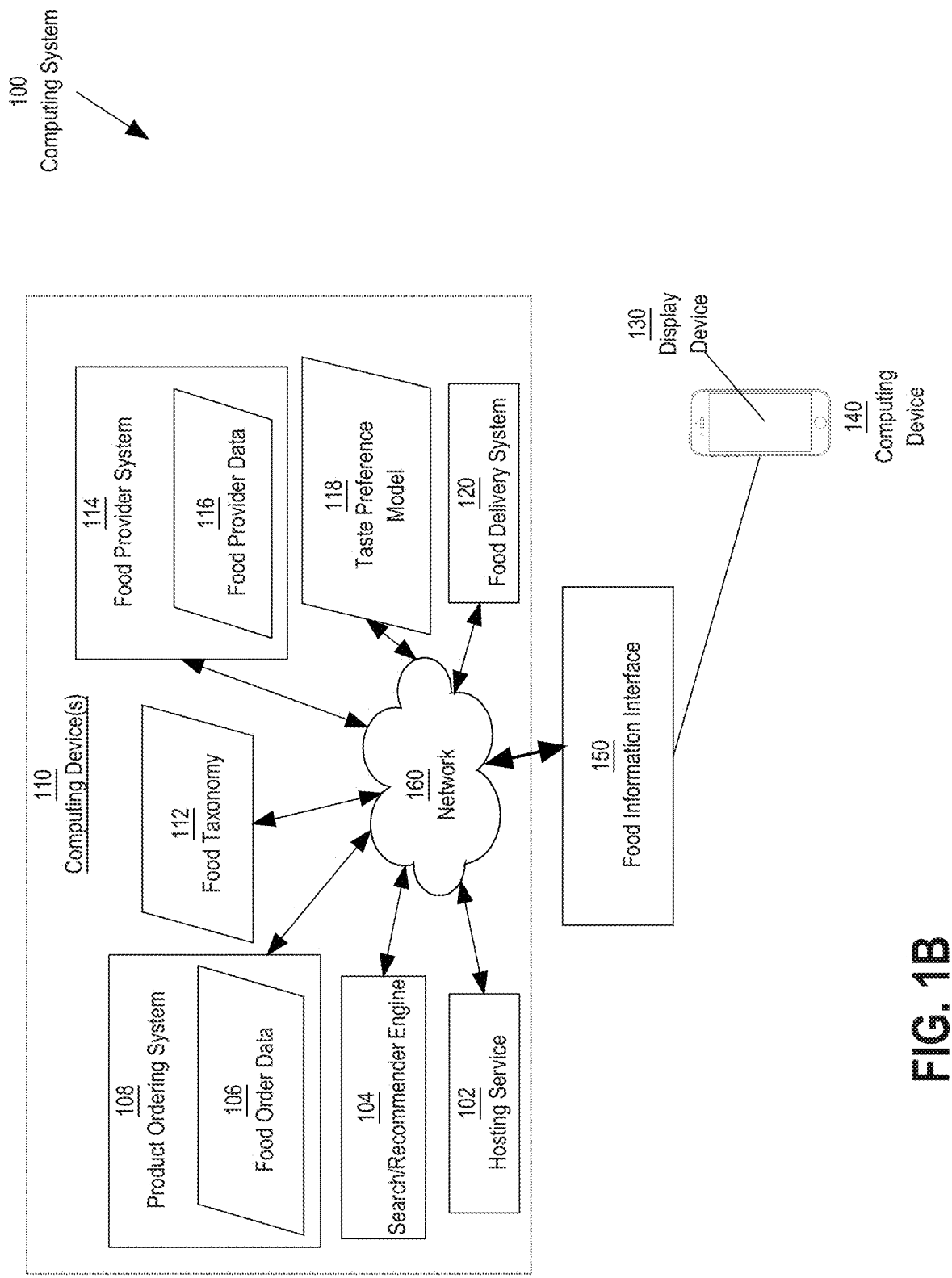
FIG. 1B is an example block diagram illustrating one or more embodiments of a computing environment including one or more electronic components in which aspects of the present disclosure may be implemented.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

Overview

Search engines and recommender systems have attempted to personalize search results and automate recommendations. Automatic annotation or disambiguation of a search query is typically based on the frequency with which search terms have appeared in historical query logs, or how recently search terms appeared in the logs, for a particular user, user account or computer. "User," whenever used in this disclosure, is intended as shorthand for a user account or end user computer.

Location data is often used as a filter for search results. For instance, map-related applications like YELP typically exclude search results that are not within a certain distance of a given geographic location.

User-provided filtering criteria also can be used to generate search results and recommendations that are more relevant, however these criteria are typically manually entered into the computing device, for example by interactions with a graphical interface.

Collaborative filtering is a technique often used in e-commerce systems, however the recommendations generated by collaborative filtering are based on both the user's prior online activity and prior online activity of other users who previously have made the same or similar online purchase as the user.

In food ordering systems, there are shortcomings to these prior approaches, Historical food ordering data is very location-specific. Thus, mere tracking of the restaurants at which individual users have eaten in the past generates data sets that are not suitable for reliably identifying restaurants based on users' overlapping food preferences. For example, if a user most frequently uses the food ordering system at lunchtime, while they are at work, the search history will be populated with food providers located near the user's office, which may not be a reliable indicator of the user's overall taste preferences. For example, prior art systems may recommend grilled chicken sandwiches based on order history but will not be able to generate a broader inference, such as that the user prefers low-fat menu items, based on the historical order data.

Even when location-based filtering is used, existing techniques are likely to simply geofence the query or search results based on the user's location, unless the user manually inputs specific taste preferences. Thus, location-based techniques by themselves are unlikely to produce a closely personalized list of search results or recommendation.

As described in this disclosure, algorithmic pattern detecting and inferencing techniques can be implemented on a networked computing system to automatically infer user-specific taste preferences from user interaction data including but not limited to historical order data, and can apply the inferred taste preferences in a new operational context. For example, using the disclosed techniques, an information search and retrieval system can automatically recommend a restaurant that matches a computationally determined taste preference of a user account when the user is in a new or unfamiliar location.

User interaction data is data that is collected and used in accordance with applicable laws, rules, regulations, policies, and user preferences. User interaction data as used herein may include explicit data such as restaurant names, dish names, comments and ratings data. Alternatively, or in addition, user interaction data may include implicit data such as history and sequences of mouse clicks, number and recency of searches performed, number of items viewed prior to placing an order, and other data indicative of other types of patterns of human-computer interactions.

The technologies described in this document can ingest large volumes of longitudinal food-related data, including electronic activity data such as online order data, and apply one or more mathematical algorithms to the ingested data to detect patterns in the data, draw inferences about the user's taste preferences based on the detected patterns of data, and create a user-specific taste preference model.

The taste preference model can be used to link the computationally inferred taste preferences with food providers, food items, and/or categories of food items. Examples of taste preferences include labels that are indicative of food-related categories. Examples of labels include categories of food (for example, main ingredients, such as Chicken or Pasta), categories of food dishes (such as Pizza or Sandwiches), categories of food providers (such as Chinese take-out or Elegant European), categories of menu items (such as Main Entrees or Desserts), menu items (such as Pad Thai or Meatball Hoagie), and/or diet-related categories (such as Vegan or Gluten-Free).

Food ordering systems can collect food-related data during online food ordering processes and store the food-related data in relational databases or other data repositories for separate analysis. For example, food ordering systems often collect, by input devices, and store in computer memory, structured data and/or unstructured data that subjectively describes an experience that a user has had with an item that was ordered using the system and associate the data with a computer account identifier.

"Account" as used in this disclosure may refer to a computer login that is accessed by a unique identifier and password, where a successful login enables operations, such as online information searching and purchases of food, to be performed by the food ordering system in connection with the account. An account identifier is any value capable of digital storage or representation that identifies an account. Various embodiments may use computer identifiers, user identifiers and other values as substitutes for account identifiers and the term "account identifier" herein is intended to encompass other identifiers having different names or labels that function in the same manner as described herein.

Structured or unstructured data also may be acquired through other kinds of signals such as reviews, text messages sent in response to survey messages, email messages, customer service ticket systems, or comment fields in a food delivery order record. As used in this disclosure, the term food order data may include any of the types of food-related data mentioned herein.

Longitudinal as used in this disclosure may refer to data that is collected over an interval of time, such as days, weeks, or months, or during a certain season of the year, where the time interval is determined to satisfy a level of confidence in the inferences that are made based on the data. Computed as used in this disclosure may refer to data that results from operation of an algorithm on input data as opposed to raw data inputs.

An example of a listing of historical food order data is shown in FIG. 1A. In FIG. 1A, each row represents an instance of food order data associated with a specific computer account identifier (Acct ID 123456). Each instance includes location data, a date/time stamp activity data and content description data. One or more of the individual data dimensions (location, date/time, description) have multiple resolutions, in one embodiment. For example, one dimension of the location data can include a geographic location such as country, city, and state, while another dimension includes a particular neighborhood name, and yet another dimension includes a user-specific location name such as home, school, or office. The date/time stamp includes date data and time of day data. The activity data includes an indication of online activity, which may be obtained from for example a web browser log file or HTTP (Hyper-text Transfer Protocol) cookies. For example, an activity labeled "order" indicates that an order was placed, in one embodiment. Other order-related activities that can be tracked include order acceptance (by the provider) and order delivery. The content description includes a description of content associated with the activity data, such as restaurant data, menu item data, menu category data, restaurant category data.

As described in more detail below, the disclosed technologies can detect patterns in food order data such as shown in FIG. 1A, use the detected patterns to infer user-specific taste preferences, and use the inferred taste preferences to improve the information search, retrieval and display operations of a computing system.

For example, using the data set shown in FIG. 1A, pattern detection technology may detect a pattern of activity occurring over a time interval under computer account 1234. Topic modeling techniques for example may use a food taxonomy (described below) to determine that the restaurant, Asian Express, offers vegetarian menu items, that "tofu pad Thai" is a menu item that does not contain meat, that "margherita pizza" is another menu item that does not contain meat in a different food genre, and the "Veggie Grill" is a restaurant that only serves vegetarian and vegan food items.

Bayesian inference techniques for example may be applied to the pattern data to infer a taste preference of "vegetarian" and associate this preference with the specific computer account, 1234. Then, when computer account 1234 is connected to a computer network in a new geographic location, the taste preference of "vegetarian" can be used to generate personalized restaurant recommendations.

FIG. 1A is provided to illustrate a clear example of food order data; however, embodiments of the solutions in this disclosure are not required to utilize the exact format shown in FIG. 1A as part of execution or operation.

In an embodiment, the disclosed technologies provide numerous benefits such as improved analysis of historical food order data using computational techniques such as topic modeling or cluster analysis techniques, and Bayesian inference methods. The disclosed technologies can use the computationally inferred taste preferences to improve or add new functionality to a food information search and retrieval system and/or a food ordering system, for example to add new capabilities to a display of food-related data or to improve the efficiency of a search engine. Other benefits are set forth below or will be apparent from study of the disclosure as a whole.

Environment Overview

FIG. 1B is an example block diagram illustrating one or more embodiments of a computing environment including one or more electronic components in which aspects of the present disclosure may be implemented.

In the embodiment of FIG. 1B, computing system 100 includes computing device(s) 110 and computing device 140, which are communicatively coupled to an electronic communications network 160. Implemented in computing devices 110, 140 using computer software, hardware, or software and hardware, are combinations of automated functionality, data structures, and digital data, which are represented schematically in FIG. 1B as hosting service 102, search/recommender engine 104, food order data 106, product ordering system 108, food taxonomy 112, food provider system 114, food provider data 116, taste preference model 118, food delivery system 120 and food information interface 150. System as used in this disclosure may refer to a single computer or network of computers and/or other devices. Computing device as used in this disclosure may refer to a computer or any other electronic device that is equipped with a processor.

Although computing system 100 may be implemented with any number N (where N is a positive integer) of hosting services 102, search engines 104, food order data 106, product ordering systems 108, food taxonomies 112, food provider systems 114, food provider data 116, taste preference models 118, food delivery systems 120, food information interfaces 150, computing devices 110, and computing devices 140, respectively, in this disclosure, these elements may be referred to in the singular form for ease of discussion.

Also, hosting service 102, search/recommender engine 104, food order data 106, product ordering systems 108, food taxonomy 112, food provider system 114, food provider data 116, taste preference model 118, food delivery system 120, food information interface 150 are shown as separate elements in FIG. 1B for ease of discussion but the illustration is not meant to imply that separation of these elements is required. The illustrated systems (or their functionality) may be divided over any number of physical systems, including a single physical computer system, and can communicate with each other in any appropriate manner.

In system 100, at least search/recommender engine 104 is hosted by a hosting service 102. Product ordering system 108, food taxonomy 112, food provider system 114, taste preference model 118 and food delivery system 120 may be hosted by the same hosting service as search/recommender engine 104 or different hosting service(s). Hosting service(s) 102 enable network access to food order data 106, food taxonomy 112, food provider data 116, taste preference model 118 and food information interface 150 by other computing services on the network 160.

The example food information interface 150 is communicatively coupled to computing device 140 and to network 160. In some embodiments, computing device 140 is a client computing device, such as an end user's smart phone or laptop machine, and computing device 110 is a server computer or network of server computers located on the Internet, in the cloud. As illustrated in FIG. 1B, a display device 130 is implemented in computing device 140 but may be implemented as a separate device or as part of another device, or as multiple networked display devices, in other implementations.

The food information interface 150 includes combinations of computer-implemented functionality, logic, data structures, and digital data, which are represented schematically in FIG. 1C, described below. In operation, computing device 140 operates food information interface 150 to establish logical connection(s) over network 160 with product ordering system 108 or food provider system 114 or search/recommender engine 104 or hosting service 102 or food taxonomy 112 or taste preference model 118 or food delivery system 120, as needed in order to configure information search and retrieval and/or automated recommendations and/or food ordering processes in accordance with inferred taste preferences that are generated by a food analytics subsystem 170, described below.

For example, food information interface 150 coordinates operation of search/recommender engine 104, product ordering system 108, food provider system 114, food delivery system 120 and food analytics subsystem 170 so that a hungry computer user can use the disclosed inferred taste preferences to cause his or her computer account to proceed seamlessly and efficiently from searching for and browsing available food options to placing a food order to be filled by a food provider and delivered to the end user.

Alternatively or in addition, in some implementations, food information interface 150 provides a display of inferred taste preferences, such as a dashboard, which can be used by the end user or by restaurants and other food providers or other participants in the supply chain to create order shortcuts, or to personalize notifications, recommendations, or advertisements, or to predict demand for certain food products or identify taste preferences that are rising and declining over time.

Logical connection or communicatively coupled as used in this disclosure may refer to a flow of digital information or data communication that is established between two devices on a network by network software communicating with, for example, the devices' operating systems either directly or by a virtual machine. Examples of protocols that may be used to establish logical network connections include hypertext transfer protocol (HTTP) and secure sockets layer (SSL).

Search/recommender engine 104 when executed by a processor provides information search and retrieval and automated recommendation capabilities, using for example keyword searching of indexes, metadata, databases, web pages and other content stored on the network 160, and retrieval and display of search results or recommendations (which may include search results). Search/recommender engine 104 can be implemented as a generic search and/or recommender engine that can search many types of data sources or as a domain-specific search and/or recommender engine that is limited to searching a specific set of data sources. For example, search/recommender engine 104 may be configured specifically for search and retrieval of food-related data stored in food provider data 116 or food order data 106, using food taxonomy 112. Activity data such as shown in FIG. 1A may be collected and stored by search/recommender engine 104.

Product ordering system 108 when executed by a processor provides product ordering capabilities. For example, once a product of interest is found using search/recommender engine 104, product ordering system 108 can collect order information, generate an electronic order and transmit the order to the provider of the ordered product electronically over the network 160. Product ordering system 108 can be implemented as a generic ordering service or as a domain-specific ordering system. For example, product ordering system 108 may be configured specifically for ordering food items from restaurants and/or other food providers.

Product ordering system 108 creates and stores, for example in a searchable database or other suitable data structure, food order data 106. Examples of food order data are shown in FIG. 1A, described above. Food order data 106 includes data associated with electronic orders of food, for example descriptions of made-to-order food items and/or other food products, and may further include activity data related to the electronic food order (such as interaction data, including indications of web browsing activity, mouse clicks, web page view history, order history, search term frequency or recency, explicitly marked favorite items).

Food order data 106 can include unique identifiers for each food order and each item in the order, the computer account placing the order, the food provider account to which the order is directed, date and time of order placed, and quantity data for individual items of the food order. Food order data 106 may also include special food preparation instructions and/or delivery instructions. Food order data may be linked with food taxonomy 112, so that food items included in food orders are linked with certain labels (such as classes or categories) in food taxonomy 112.

Food taxonomy 112 provides a computer-implemented vocabulary of labels for food items, food products and food providers, and defines relationships between food-related labels at different levels of abstraction. Food taxonomy 112 also associates attributes with data labels. Food taxonomy 112 may be implemented as for example a hierarchical data structure such as an ontology or a directed graph, where a node in the graph represents a label and the node has a set of attributes. Food taxonomy 112 may be implemented as a data model using for example JSON (JavaScript Object Notation).

Labels representing higher levels of abstraction may be represented at higher levels in the graph for example by root nodes, while labels representing lower levels of abstraction may be represented at lower levels in the graph for example by child nodes.

As an example, food taxonomy 112 may include the following labels: dish, dish category, menu item, menu item category and restaurant class, where dish category is a root node and a label associated with the dish category node may be defined as a normalized or canonical label for a group of similar consumable items, an example of which may be Salad. That is, labels can be instantiated with instances of data, for example Salad is an instance of the dish category label. Thus, when populated with data items (or instantiated), food taxonomy 112 may include both labels and instances of labels.

Continuing the example, in food taxonomy 112, dish may be a child of dish category with the relationship between dish category and dish represented by a link or edge connecting the two nodes. Dish may be defined as a normalized or canonical label for a consumable item, an example instance of which may be Caesar salad.

Food taxonomy 112 may be used to classify variable data, for example in the case where two different restaurants have different names for the same dish or a restaurant has multiple variations of the same dish. To do this, food taxonomy 112 may include the label menu item and a link between menu item and dish. Menu item may be defined as a variable label for a consumable item as the item appears in a particular restaurant menu. Instances of menu item may include Charred Romaine salad with house-made Caesar dressing and House Caesar salad, both of which could be classified as Caesar Salad, a dish.

Similarly, food taxonomy 112 may be used to classify variable data, such as in the case where a restaurant has multiple offerings in the same category. Menu item category may be defined as a variable label for a group of similar consumable items as it appears in a particular restaurant menu. An instance of menu item category for a particular food provider may be Entrée-sized Salads. In food taxonomy 112, a menu item category of a particular restaurant may be linked with a normalized dish category, for example entrée-sized salads may be linked with the normalized or canonical label, Salad.

Food taxonomy 112 may be used to classify restaurants and/or other food providers. For example, food taxonomy 112 may include restaurant class, a label for a group of restaurants that are similar in cuisine, menu, service area, customer class or other factors, such that it makes sense to compare them. Example instances of restaurant class include Wood-fired Thin Crust Pizza Places, Elegant Contemporary European, Asian, Downtown, Brunch. Food taxonomy 112 enables the analytical techniques and technologies described herein to be performed for restaurants and/or for individual menu items.

Food provider system 114 is part of or interfaces with product ordering system 108. For example, food provider system 114 maintains food provider data 116, which includes descriptions and specifications for food items that are offered for purchase through the electronic system implemented in computing system 100. Food provider system 114 may store and monitor changes in food provider data 116, for example, price and availability of menu items, graphics and text descriptions of menu items, and electronic activity data 105. Food provider data 116 may further include information about the food provider itself, such as name, location, business hours, and contact information. Portions of food provider data 116 and/or food order data 106 may be used to instantiate food taxonomy 112 (with, for example, restaurant-specific instances of menu items and order data corresponding to the menu items).

Taste preference model 118 is a model of taste preferences that is created using computationally identified patterns in food order data 106 and the data items that evidence the patterns, as determined by for example rules or probabilistic or statistical computations. As used in this disclosure model may refer to computer-implemented data structure(s) and/or computer code that store and enable access to information about data items including links or relationships between different data items. For instance, taste preference model 118 may contain many instances of patterns that are detected over time (which may be represented for example by vectors) and links between the taste preferences and specific patterns that correspond to or evidence those taste preferences. Taste preference model 118 may include individual preference models that are specific to individual computer accounts or computing system 100 may be implemented with separate models 118 for each individual computer account.

As described in more detail below, food analytics subsystem 170 creates taste preference model 118 by using food taxonomy 112 to associate instances of food order data 106 with label(s) such as menu item, menu item category, dish, dish category, or restaurant class, performing pattern detection on the annotated data, and executing automated inferencing on patterns detected in the annotated food order data, to generate inferred taste preferences. Associate as used in this disclosure may refer to automated annotating or tagging or labeling, such as by adding metadata to a file or a data record.

In one embodiment, taste preferences are multidimensional and include price, time, delivery fee and/or other criteria associated with food preferences or ordering processes. In other embodiments, the inference model pattern matching processes learn preferences, computationally, over time as more data is added to the model. The learned preferences may not be explicitly communicated to the user in human readable form, but may be latent features of the model that are incorporated into the user interface. An example of a learned preference derived from a latent feature of the model is that a particular user may prefer to interact with the user interface in a specific way, for example, always viewing an image of a food item before placing an order.

In another embodiment, the system associates user-specific weights with individual preferences and uses those weights to determine which of the user's multi-dimensional preference is more important in the context of a particular food order. For example, if the system has inferred both a taste preference of soup and a time preference of "within 30 minutes" to make sure that the soup is delivered while it is still hot, and the system receives a soup order from the user but determines that the soup's availability does not match the user's time preference, the system uses the inference model to determine that the user's time preference is more important than the taste preference for the user in this particular context, and then generates an alternative recommendation that matches the user's time preference and also matches the user's taste preference as closely as possible.

Food delivery system 120 when executed by a processor enables scheduling of pick-up or deliveries of orders received by product ordering system 108. As such, food delivery system 120 communicates with product ordering system 108 over network 160. Food delivery system 120 can be implemented as a generic delivery service or as a domain-specific product delivery system. For example, food delivery system 120 may be configured specifically for scheduling and tracking delivery of made-to-order food items.

Configuring Information Search and Retrieval

Figure 1C:
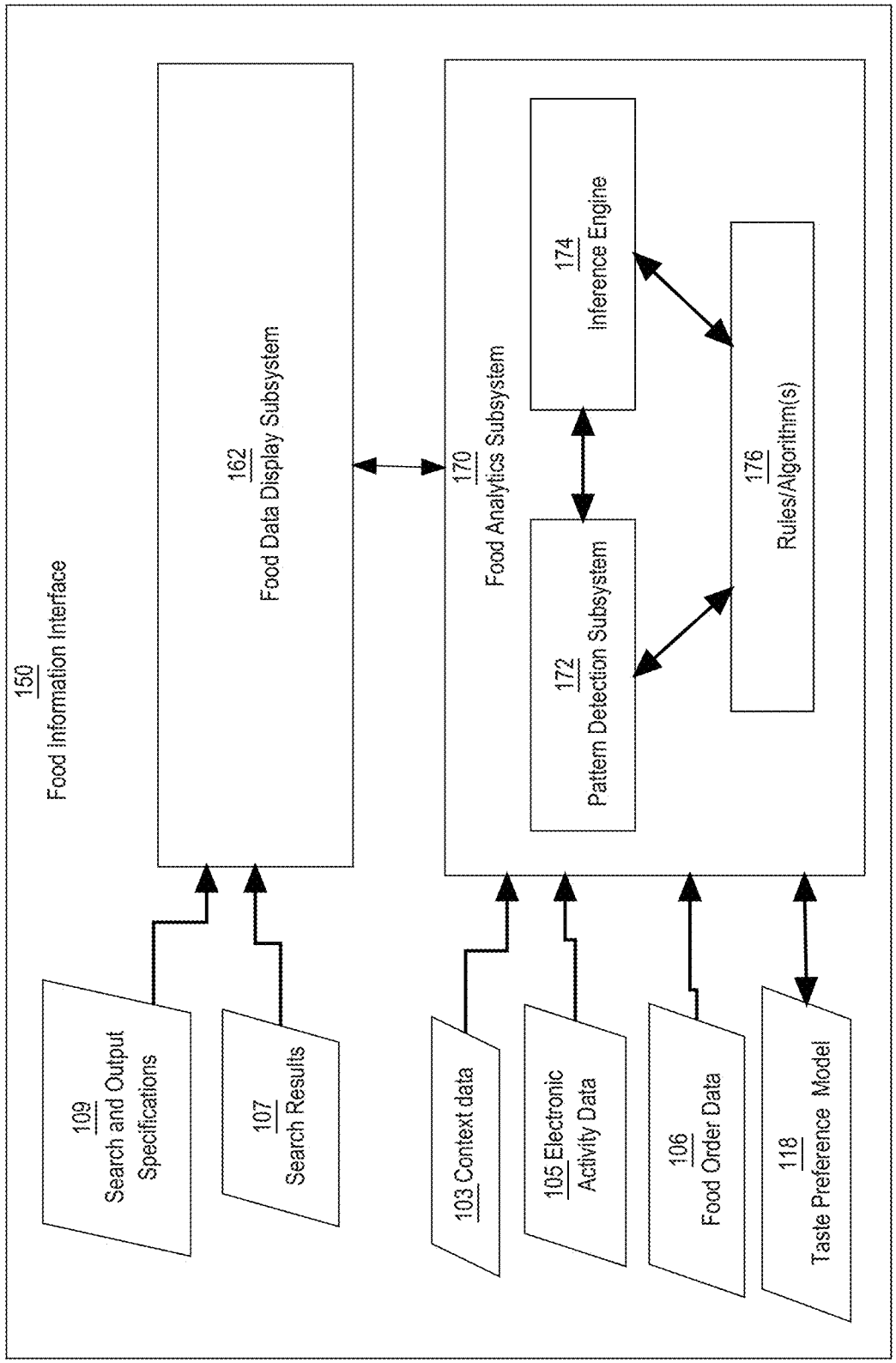
FIG. 1C is an example block diagram illustrating one or more embodiments of the food information interface of FIG. 1A.

FIG. 1C is an example block diagram illustrating one or more embodiments of the food information interface of FIG. 1B.

Food information interface 150 and its components include combinations of computer-implemented functionality, logic, data structures, and digital data. The example food information interface 150 includes a food data display subsystem 162 and a food analytics subsystem 170. The example food analytics subsystem 170 includes a pattern detection subsystem 172, an inference engine 174 and rules/algorithm(s) 176. Food information interface 150 utilizes input data, which may be obtained from other sources over network 160, and may include taste preference model 118, food order data 106, electronic activity data 105, context data 103, search results 107 and search and output specifications 109.

Food data display subsystem 162 communicates with search/recommender engine 104 and/or product ordering system 108 over network 160 to configure information search, retrieval and browsing functionality according to inferred taste preferences that are generated by food analytics subsystem 170. For instance, food data display subsystem 162 modifies output specifications 109 for the display of search results 107 in accordance with certain taste preferences generated by food analytics subsystem 170.

Search results 107 include a list of references to one or more data items retrieved by search/recommender engine 104 in response to a query such as a keyword or natural language (speech or text) search. Search results 107 can include for example names of restaurants or other food providers and/or names of food items offered by particular restaurants. Search results 107 can include text, graphics, and/or interactive elements such as buttons or hyperlinks.

Electronic activity data 105 includes browser activity data as described above, and may include information associated with computer interactions of a specific computer account with items of search results 107. For example, computer actions may include actions performed or detected by input devices 514 or control devices 516, which are described below and shown in FIG. 5.

Context data 103 includes data that is extracted from signal(s) received or generated by, for example, sensor(s) of computing device 140, which may include any of the types of sensors described below in FIG. 5 or other sensors. Context data 103 includes, for example, location data, date data, time of day data. Context data 103 may be linked with food order data 106 as shown for example in FIG. 1A.

Search and output specifications 109 include runtime specifications for executing search queries, generating automated recommendations, and displaying search results, recommendations, and related data (such as food provider data 116), including for example coordinate data for on-screen spatial arrangements and ranking data for sequential orderings of data items. Food data display subsystem 162 uses inferred taste preferences generated by food analytics subsystem 170 to modify search and output specifications 109.

Examples of ways in which the inferred taste preferences generated by food analytics subsystem 170 can be used include generating an automated recommendation using a taste preference label as a parameter, modifying a search query to include a taste preference label as a parameter to search, filter or rank of search results 107, modifying the timing of searching or the order of display of certain search results 107, or modifying a graphical component of a visualization of the search results 107 (for instance, by adding graphical quality indicators to the display of certain search results 107).

In one embodiment, food data display subsystem 162 provides the display responsively, for example in response to a computer account loading a web page on a local computing device. In another embodiment, food information interface 150 provides the display proactively, for example by email, text message, or other type of push notification. These displays are contextual in that the inferred taste preferences that are presented are determined based on calendar data including the time of day and the day of the week, or based on context data such as data indicative of a particular geographic location.

Food-Related Analytics

In the example of FIG. 1C, rules/algorithm(s) 176 are executed by pattern detection subsystem 172 and inference engine 174 to generate the inferred taste preferences that are used to configure information search and retrieval and/or automated recommendations and/or product ordering functionality as described above. Pattern detection subsystem 172 and inference engine 174 may operate using offline processing to continuously or periodically generate and update the inferred taste preferences or may operate online for example in response to a change in context data or a search query or other input data.

Pattern detection subsystem 172 when executed by a processor analyzes sets of food order data 106 using rules/algorithms 176 to identify patterns or relationships among data items in the data sets. In one embodiment, rules/algorithms 176 capture food order patterns using Bayesian belief networks, search and order pattern matching, and other automated classification methods. Patterns or relationships may include semantic similarities. For example, pattern detection subsystem 172 may compute similarity metrics to measure the similarity of two content descriptions in a pair of content descriptions, or pattern detection subsystem 172 may perform statistical modeling (such as topic modeling) or a cluster analysis in order to group similar or related data items together. Pattern detection subsystem 172 may output groupings or sequences of data items in a detected pattern for analysis by inference engine 174. In one embodiment, nearest neighbor methods and/or word embedding systems can be used to determine the semantic distance between items.

Inference engine 174 applies for example rules or Bayesian inference modeling techniques contained in rules/algorithms 176 to determine, when an explicit preference is not available, whether a taste preference can be inferred from a pattern detected by pattern detection subsystem 172. To do this, inference engine 174 may compare the detected pattern output by pattern detection subsystem 172 to existing pattern (s) in taste preference model 118. If the detected pattern is similar enough to a pattern in taste preference model 118, inference engine 174 may assign the taste preference linked with the pattern in the taste preference model 118 to the detected pattern. To determine whether the detected pattern is similar enough to a pattern in the taste preference model, inference engine 174 may use for example a semantic analysis approach and compute a measure of semantic similarity between the detected pattern and the pattern in the taste preference model 118. Inference engine 174 may then compare the similarity measure to a threshold value, which may be defined based on the requirements of a particular design of computing system 100. If the similarity measure exceeds the threshold value, the taste preference associated with the model pattern may be assigned to the detected pattern.

The food data display subsystem 162 can use the inferred taste preference to highlight a menu item that falls within the taste preference, for example by boosting search results that have an ingredient that corresponds to the inferred taste preference, when displaying a list of menu items for a restaurant, or to sort a list of menu items in a set of search results 107 so that the item(s) that correspond to the taste preference appear at the top of a list of search results, or to automatically generate an electronic notification (such as a push notification) recommending a menu item associated with the taste preference, when a query or preference for salad more generally is detected.

In one example, suppose a user inputs the search term, "burrito" and the system has inferred a taste preference of "vegetarian." The system will adapt the search query to increase a ranking of a search result that contains both the original search term and a term that corresponds to the inferred preference. For example, if the search query is "burrito" and the inferred taste preference is "vegetarian" then search results containing the term "vegetarian" or similar or related terms would be ranked higher than other search results. The system will adjust rank values associated with individual search results so that items that correspond to the inferred preference are ranked higher than other items, but other items retrieved by the search are also included in the search results. In yet another embodiment, food data display subsystem 162 supplements or replaces search results returned by execution of the original search query with related items that correspond to the inferred preferences. For example, if the original search terms turn up no results at a particular time of day or geographic location, the subsystem 162 uses an ontology or taxonomy to determine related items based on the inferred taste preference, and presents a recommendation based on the modified search results. To illustrate, the system may determine that there are no restaurants that have menu items matching a search term "pulav" in a particular location at a particular time of day, and the system then, using the inferred taste preference, automatically finds items that are related to "pulav" in the system's ontology or taxonomy, such as "fried rice", and displays those items in the search results.

Figure 2A:
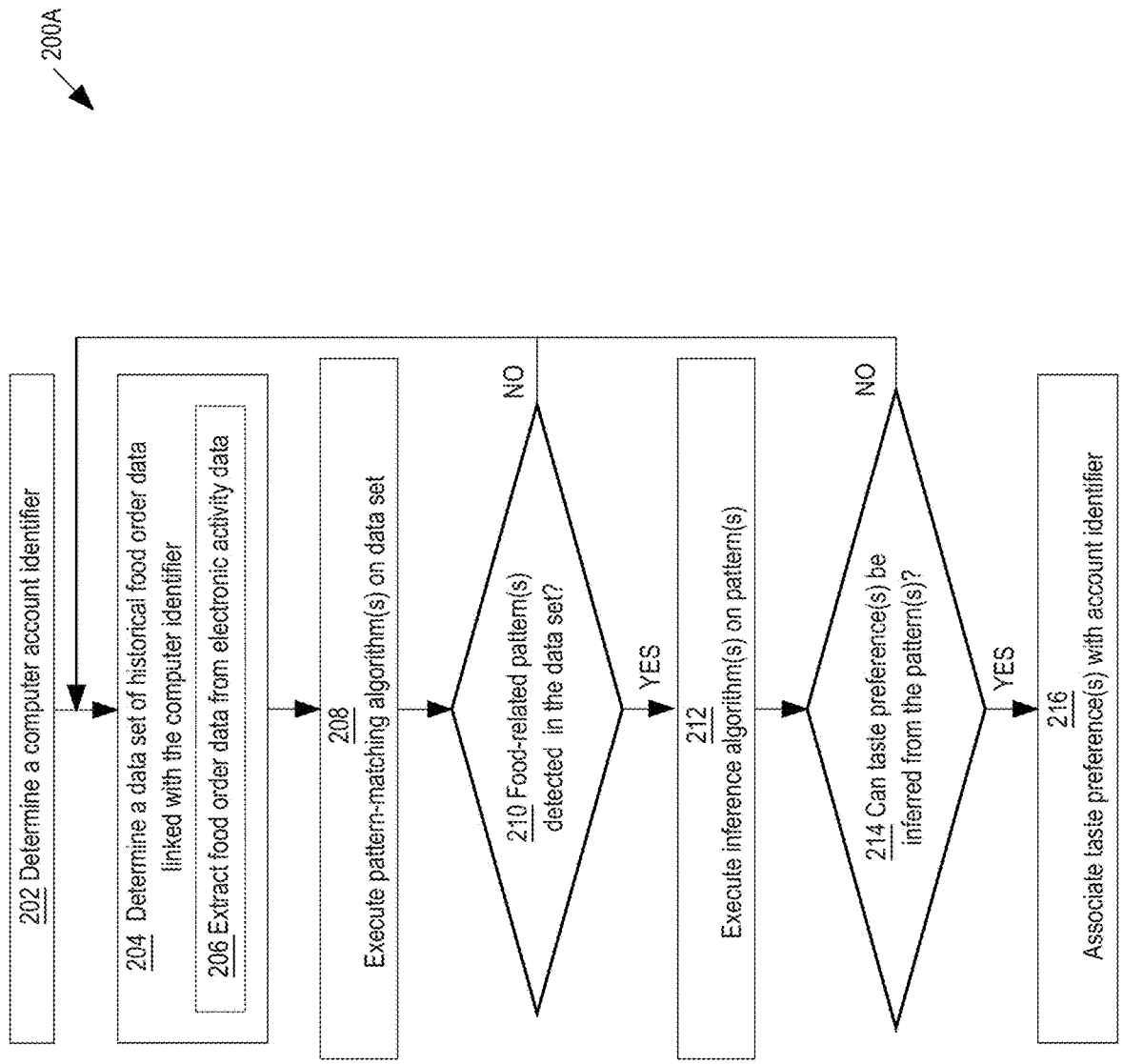
FIG. 2A is an example flow diagram of a process that may be executed by one or more components of the computing environment of FIG. 1.

FIG. 2A is a simplified flow diagram of an embodiment of operations that can be performed by one or more components of a computing environment. For purposes of illustrating a clear example, FIG. 2A is described in the context of computing system 100 and food information interface 150, but other embodiments may use other environments or implemented techniques. The operations of a flow 200A as shown in FIG. 2A can be implemented using processor-executable instructions that are stored in computer memory. For purposes of providing a clear example, the operations of FIG. 2A are described as performed by computing device(s) 110, 140, which may be individually or collectively referred to as simply 'computing device.'

FIG. 2A relates to a process for automatically inferring a taste preference from food order data. Whereas operations 202-216 can occur in an offline mode, any or all of operations 202-216 may occur in either an offline or online/live execution environment.

In operation 202, computing device determines a computer account identifier, for example through a login process.

In operation 204, computing device determines a data set of historical food data linked with the computer identifier. To do this, computing device may extract food order data from electronic activity data (such as search history or browser activity data) using operation 206. The data set may be bounded or filtered, for example by date range or location data.

In operation 208, computing device executes one or more pattern matching algorithms on the data set determined in operation 204. To do this, computing device analyzes food order data, particularly content description data or other food-related information, using for example semantic analysis techniques and/or taxonomy 112. Example methods for performing pattern matching are described above with reference to FIG. 1C.

In operation 210, computing device determines whether any food-related patterns are detected in the data set. To do this, computing device may execute one or more statistical modeling algorithms, as described above. If no patterns are detected, computing device may return to operation 204 to analyze another data set or wait until additional data are added to the data set.

When a food-related pattern is detected in the data set determined in operation 204, then in operation 212, computing device executes one or more inference algorithms on the detected patterns to determine whether the detected pattern correlates with a taste preference. For example, computing device executes one or more rules implemented in computer logic for determining whether a computed measure of similarity between the detected pattern and a known pattern meets a threshold level of similarity.

In operation 214, computing device determines whether the similarity between the detected pattern and the known pattern is determined with a high enough confidence level such that the taste preference associated with the known pattern should be applied to the detected pattern. If computing device determines that the confidence level does not meet a confidence threshold, computing device may return to operation 204 as described above or wait for additional data items to be added to the data set.

When the comparison performed in operation 214 is successful, computing device proceeds to operation 216 and associates a taste preference label with the detected pattern.

Figure 2B:
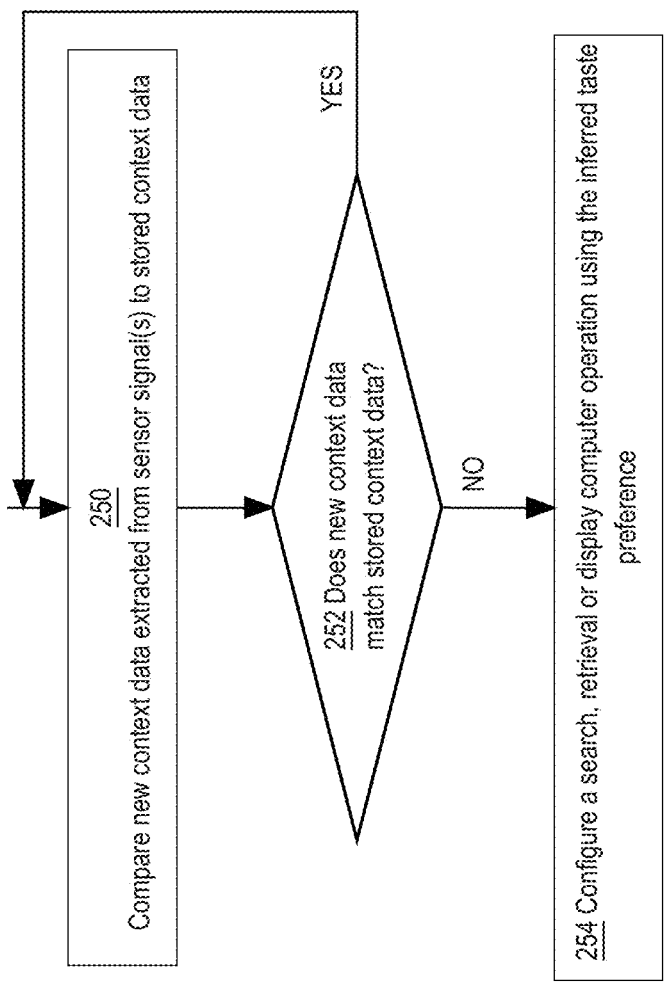
FIG. 2B is an example flow diagram of another process that may be executed by one or more components of the computing environment of FIG. 1.

FIG. 2B is a simplified flow diagram of an embodiment of operations that can be performed by one or more components of a computing environment. For purposes of illustrating a clear example, FIG. 2B is described in the context of computing system 100 and food information interface 150, but other embodiments may use other environments or implemented techniques. The operations of a flow 200B as shown in FIG. 2B can be implemented using processor-executable instructions that are stored in computer memory. For purposes of providing a clear example, the operations of FIG. 2B are described as performed by computing device(s) 110, 140, which may be individually or collectively referred to as simply 'computing device.'

FIG. 2B illustrates a process for using inferred taste preferences determined by the processes of FIG. 2A to configure computer operations. Operations 250-254 typically occur during an online/live operation of the computing system 100, however, any or all of operations 250-254 may occur in either an offline or an online/live execution environment.

In operation 250, computing device compares new context data extracted from sensor signal(s) to stored context data. To do this, computing device for example obtains geographic location data from a global positioning system or other location-based system of computing device 140. Computing device compares the new context data to context data 103 that is associated with food order data 106, for example as shown in FIG. 1A.

In operation 252, computing device determines whether the new context data obtained in operation 250 matches any of the stored context data obtained from for example food order data 106 and/or context data 103. When the new context data matches a context in the stored context data, computing device may return to operation 250 and wait for another new context to be detected. In other words, computing device may use other simpler personalization techniques if the context is already known (such as in the case of a frequently visited location).

When the new context data does not match a stored context data, computing device proceeds to operation 254. In operation 254, computing device configures a search, retrieval, recommendation or display computer operation using the inferred taste preference. For example, when restaurant data is retrieved by a search query, operation 254 determines whether a restaurant in the restaurant data matches the inferred taste preference.

When restaurant data or menu item data matching the inferred taste preference is to be displayed in a display device, operation 254 causes the display device to display a taste preference indicator in association with the displayed restaurant or menu item data. In doing so, operation 254 may determine a position for display of the data associated with the taste preference label relative to other data retrieved by the query. That is, operation 254 may cause a display device to display restaurant and/or menu item data according to a spatial and/or sequential arrangement or using particular graphical elements associated with the inferred taste preference, which may be specified in search and output specifications 109.

Similarly, although not shown specifically in FIG. 2B, operation 254 may configure a search query or automated recommendation or information retrieval operation using inferred taste preferences determined in the process of FIG. 2A, for example by adding a taste preference label to a query as a keyword or using the taste preference label as a filter.

Presentation of Inferred Taste Preferences

Figure 3:
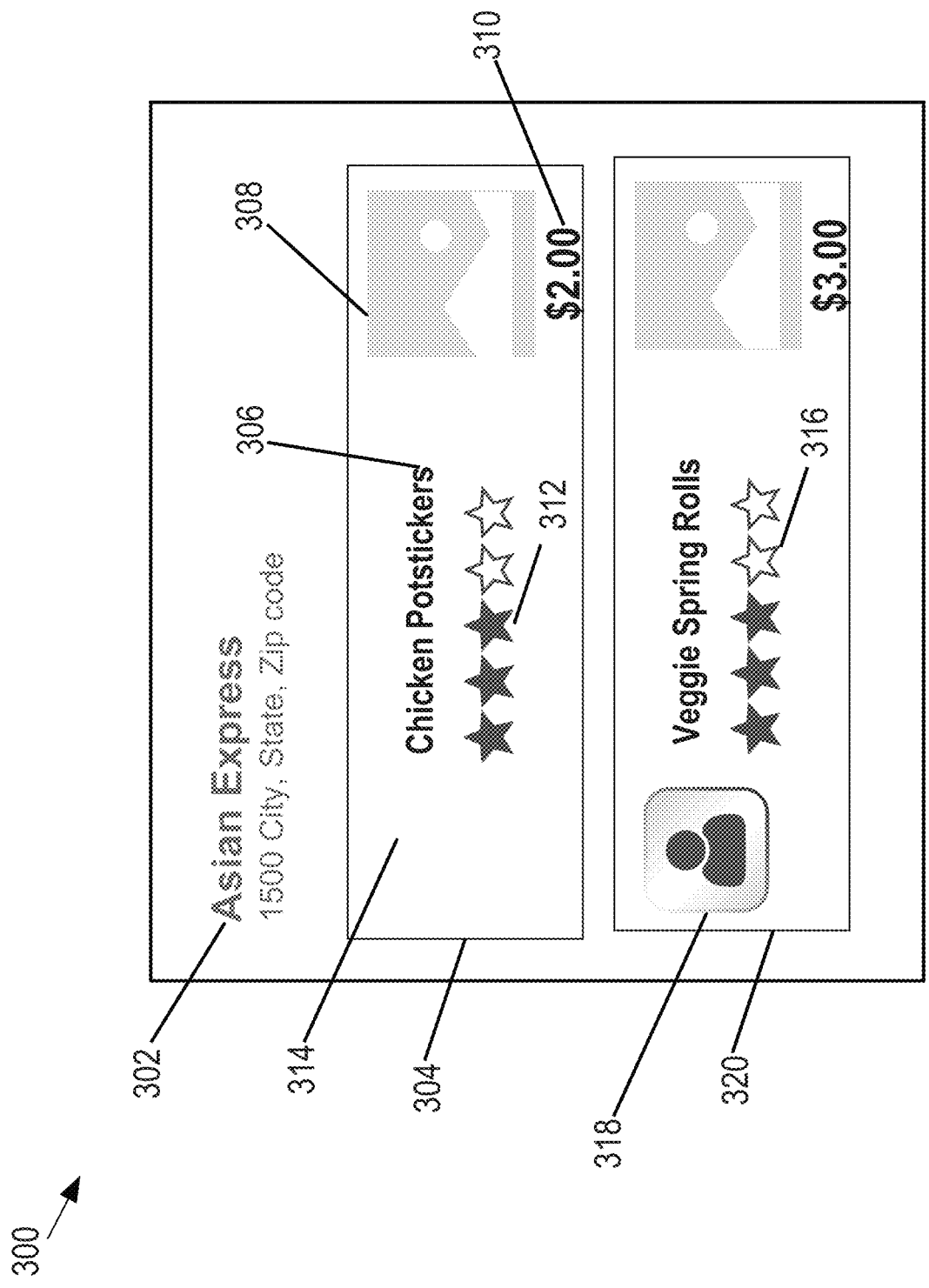
FIG. 3 is an example of a graphical interface that may be generated and displayed by one or more components of the computing environment of FIG. 1.

FIG. 3 is an example of a graphical interface that may be generated and displayed by one or more components of the computing environment of FIG. 1. In an embodiment, GUI 300 may be displayed by computing device 140 implementing portions of food information interface 150.

GUI 300 shows a visual representation of food-related data that may be displayed by display device as part of an automated recommendation triggered by a change in context or in results of a search query including the keyword Asian and selection of Asian Express from a list of food providers displayed in search results for that query. GUI 300 includes food provider data 302 and instances 304, 320 of food item (menu item) data. As shown for instance 304, the instances of food item data include food item name (306), a graphic (such as a digital image of the food item) 308, price 310. Each instance of food item data 304, 320 also includes ratings data 312, 316.

The graphical element 318 displayed in menu item 320 represents an inferred taste preference computed as described above. For example, graphical element 318 may indicate that the veggie spring rolls correlate highly with a taste preference of 'vegetarian'—where the taste preference is personalized based on historical food order data associated with a specific computer account. For instance, graphical element may contain a user-selected image or graphic, such as a digital image of the user operating computing device 140 under the computer account associated with the food order data used to generate the taste preference.

Figure 4:
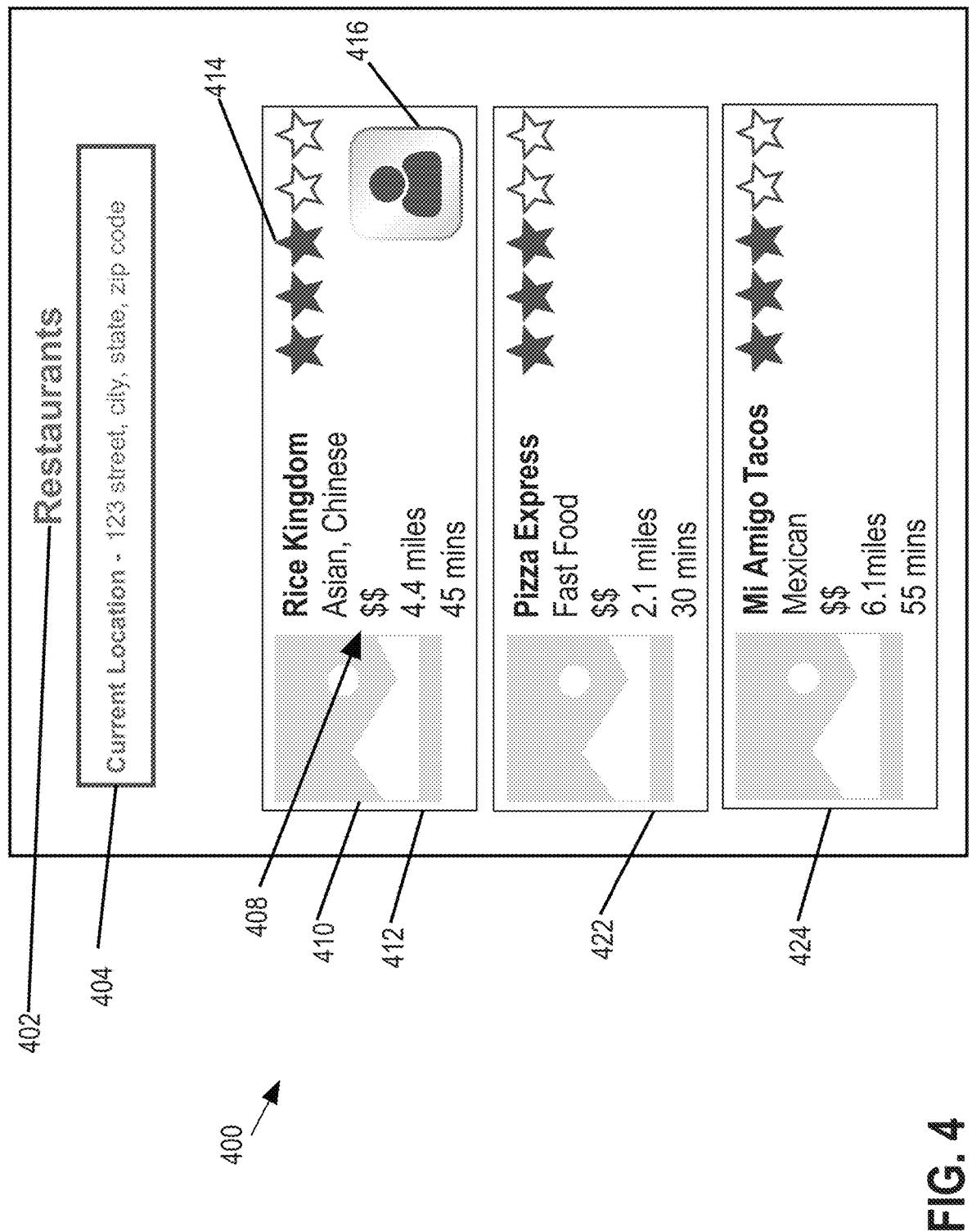
FIG. 4 is an example of another graphical interface that may be generated and displayed by one or more components of the computing environment of FIG. 1.

FIG. 4 is a simplified illustration of another graphical interface (GUI). In an embodiment, GUI 400 may be displayed by computing device 140 implementing portions of food information interface 150.

GUI 400 shows a visual representation of food-related data that may be displayed by display device in response to execution of an automated recommendation triggered by a change in context. GUI 300 includes a title of the display screen 402 and a location display block 404 (which is automatically populated with location data extracted from sensor signals, for example).

In response to the change in context, GUI 400 displays food provider (restaurant) data items 412, 422, 424, which include information for restaurants within a certain range of the location of the new context (shown in location block 404). Food provider data items 412, 422, 424 include food provider data 408 (such as restaurant name, categories, price level, distance from location, and estimated wait time). Each instance of food provider data 412, 422, 424 also includes ratings data (for example 414).

However, in this example, only instance 412 includes the graphical element 416. Graphical element 416 signifies that the food provider (Rice Kingdom) correlates highly with the inferred taste preference computed as described above.

Graphical element 318 (FIG. 3) and/or graphical element 416 may be interactive such that activation (selection) of the element with for example a tap on a touchscreen causes GUI 400 to display more detailed information about the inferred taste preference, such as the taste preference label and data items in the historical food order data set that were used by the rules/algorithms 176 as evidence of the taste preference.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
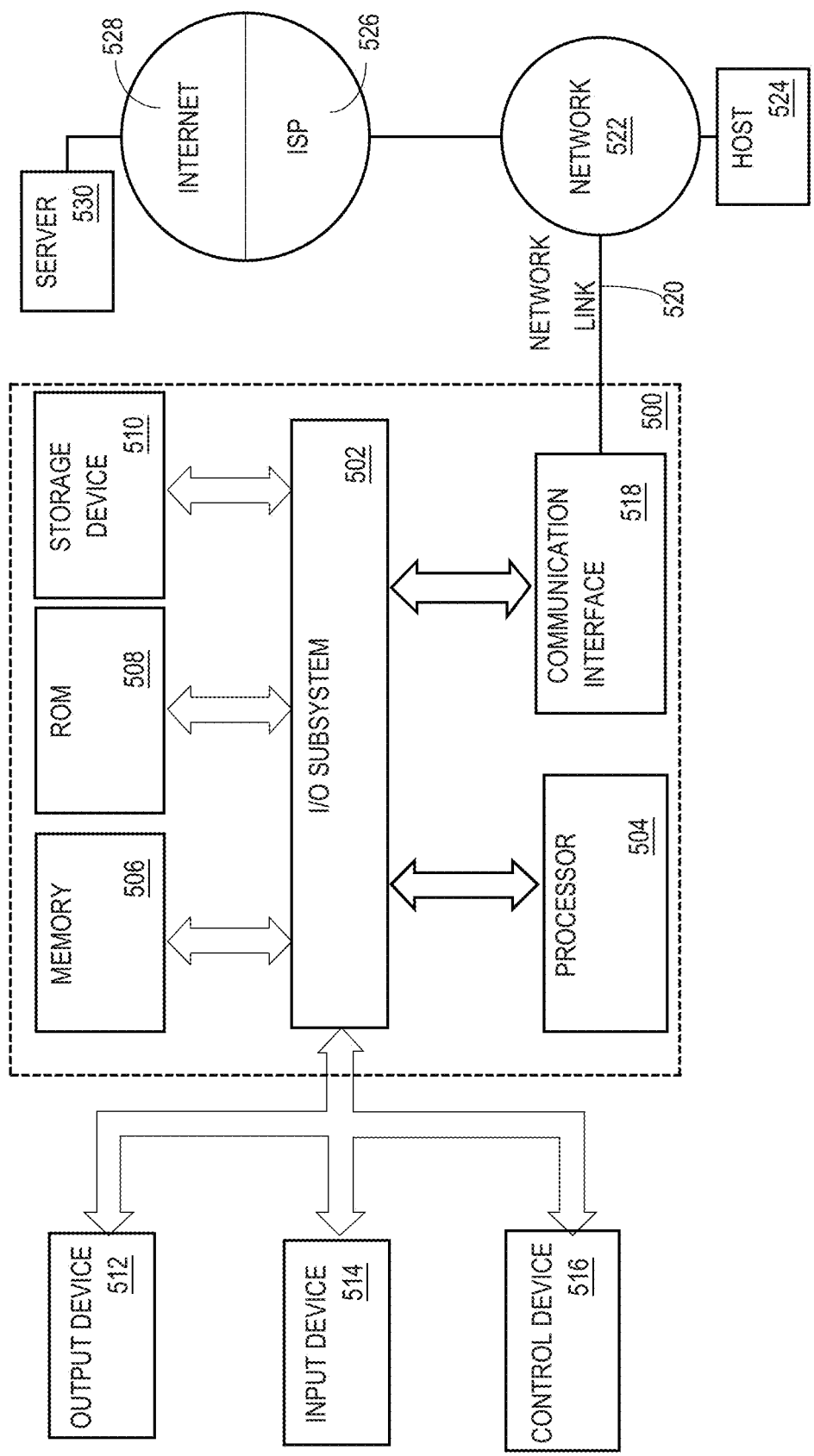
FIG. 5 is an example block diagram illustrating an embodiment of a hardware environment, which may be used to implement various aspects of the computing environment of FIG. 1.

For example, FIG. 5 is a block diagram that illustrates a computer system 500 upon which an embodiment of the present invention may be implemented. FIG. 5 illustrates a single computer node embodiment. Other embodiments use multiple clustered nodes in which the computations described herein are distributed across a cluster of computers, i.e., portions of the computations are performed by different computers in a networked set of computers.

Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A computer-implemented method for configuring a computer search, retrieval display, or notification operation involving a food ordering computer system, the method comprising, using a computing device that is communicatively couplable to the food ordering computer system:
   determining a computer account identifier for a user account associated with the computing device;
   storing, in a food provider system, food provider data for a plurality of food providers, the food provider data for a food provider comprising information about the food provider and food order data comprising one or more food items corresponding to the food provider;
   assigning a plurality of labels to each food item in the food provider system, the plurality of labels comprising a dish, a dish category, a menu item, a menu item category and a restaurant class, the plurality of labels comprising a food taxonomy;
   determining a data set, the data set comprising a plurality of instances of historical food order data linked with the computer account identifier, an instance of the plurality of instances is created as a result of an electronic activity associated with the food ordering computer system by the user account, the instance comprising a description of one or more food items and identifying at least a restaurant and a context of the electronic activity, the context comprising a time of day, a day of week, and a location of a food provider of the plurality of food providers, the data set comprising at least two instances that have different contexts;
   determining at least one food-related pattern for the user account by executing a pattern matching algorithm on the data set;
   determining an inferred taste preference for the user account by executing an inference algorithm on the at least one food-related pattern using the taxonomy;
   linking the inferred taste preference with the computer account identifier;
   in response to receiving a user input comprising a search term:
      using a signal from a sensor communicatively coupled to the computing device, detecting a new context associated with the computer account identifier;
      conducting a computer search for the search term in the food provider system, the computer search being performed based on the search term and corresponding to the new context;
   determining that a first set of search results based on the search term and corresponding to the new context is not represented in the food provider system;
   in response to determining that the first set of search results is not represented in the food provider system:
      configuring the computer search using a label selected from the plurality of labels as a parameter;
      modifying an output specification to display a second set of search results based on the selected label and the new context; and
   causing executing of a computer operation using the food ordering computer system.

2. The method of claim 1, comprising extracting at least one of the instances of the food order data from web browsing activity data associated with the computer account identifier.

3. The method of claim 1, comprising:
   detecting the new context by comparing a location of the new context to location data in the data set;
   determining that the location of the new context does not match the location data in the data set, and
   in response to determining that the location of the new context does not match the location data in the data set, performing one or more of:
   modifying the computer search to include the inferred taste preference; and
   modifying an order of display of the second set of search results.

4. The method of claim 3, comprising, in response to determining that the location of the new context does not match the location data in the data set;
   modifying the computer search to search the food provider system based on the food taxonomy; and
   generating an automated recommendation comprising restaurant data or menu item data matching the inferred taste preference and associated with the location of the new context.

5. The method of claim 1, comprising:
   detecting the new context by comparing a time of day of the new context to time of day data in the data set;
   determining that the time of day of the new context does not match the time of day data in the data set, and
   in response to determining that the time of day of the new context does not match the time of day data in the data set, performing one or more of:
   modifying the computer search to include the inferred taste preference;
   modifying a timing of the computer search; and
   modifying an order of display of the second set of search results.

6. The method of claim 5, comprising, in response to determining that the time of day of the new context does not match the time of day data in the data set, generating an automated recommendation comprising restaurant data or menu item data matching the inferred taste preference and associated with the time of day of the new context.

7. The method of claim 1, comprising:
   detecting the new context by comparing a date of the new context to date data in the data set;
   determining that the date of the new context does not match the date data in the data set, and
   in response to determining that the date of the new context does not match the date data in the data set, performing one or more of:
   modifying the computer search to include the inferred taste preference;
   modifying a timing of the computer search; and
   modifying an order of display of the second set of search results.

8. The method of claim 7, comprising, in response to determining that the date of the new context does not match the date data in the data set, generating an automated recommendation comprising restaurant data or menu item data matching the inferred taste preference and associated with the date of the new context.

9. The method of claim 1, further comprising displaying a taste preference indicator in association with a search result of the second set of search results.

10. A system for configuring an account-specific computer search, retrieval or display operation using a food ordering computer system, the system comprising:
  one or more processors;
  a communication interface coupled to the one or more processors;
  one or more non-transitory computer-readable storage media coupled to the one or more processors and storing sequences of instructions, which when executed by the one or more processors, cause the one or more processors to perform operations comprising:
  determining a computer account identifier for a user account associated with the computing device;
  storing, in a food provider system, food provider data for a plurality of food providers, wherein the food provider data for a food provider comprises information about the food provider and food order data comprising one or more food items corresponding to the food provider;
  assigning a plurality of labels to each food item in the food provider system, the plurality of labels comprising a dish, a dish category, a menu item, a menu item category and a restaurant class, wherein the plurality of labels comprise a food taxonomy;
  determining a data set, the data set comprising a plurality of instances of historical food order data linked with the computer account identifier, an instance of the plurality of instances is created as a result of an electronic activity associated with the food ordering computer system by the user account, the instance comprising a description of one or more food items and identifying at least a restaurant and a context of the electronic activity, the context comprising a time of day, a day of week, and a location of a food provider of the plurality of food providers, the data set comprising at least two instances that have different contexts;
  determining at least one food-related pattern for the user account by executing a pattern matching algorithm on the data set;
  determining an inferred taste preference for the user account by executing an inference algorithm on the at least one food-related pattern using the taxonomy;
  linking the inferred taste preference with the computer account identifier;
  in response to receiving a user input comprising a search term:
  using a signal from a sensor communicatively coupled to the system, detecting a new context associated with the computer account identifier;
    conducting a computer search for the search term in the food provider system, the computer search being performed based on the search term and corresponding to the new context;
  determining that a first set of search results based on the search term and corresponding to the new context is not represented in the food provider system;
  in response to determining that the first set of search results is not represented in the food provider system:
    configuring the computer search using a label selected from the plurality of labels as a parameter; and
    modifying an output specification to display a second set of search results based on the selected label and the new context; and
  causing executing of a computer operation using the food ordering computer system.

11. The system of claim 10, wherein the instructions, when executed by the one or more processors, cause the one or more processors to perform operations comprising extracting at least one of the instances of the food order data from web browsing activity data associated with the computer account identifier.

12. The system of claim 10, wherein the instructions, when executed by the one or more processors, cause the one or more processors to perform operations comprising:
  detecting the new context by comparing a location of the new context to location data in the data set;
  determining that the location of the new context does not match the location data in the data set, and
  in response to determining that the location of the new context does not match the location data in the data set, cause the one or more processors to perform one or more operations comprising:
    modifying the computer search to include the inferred taste preference; and
    modifying an order of display of the second set of search results.

13. The system of claim 12, wherein the instructions, when executed by the one or more processors, cause the one or more processors to perform operations comprising, in response to determining that the location of the new context does not match the location data in the data set, generating an automated recommendation comprising restaurant data or menu item data matching the inferred taste preference and associated with the location of the new context.

14. The system of claim 10, wherein the instructions, when executed by the one or more processors, cause the one or more processors to perform operations comprising:
  detecting the new context by comparing a time of day of the new context to time of day data in the data set;
  determining that the time of day of the new context matches the time of day data in the data set, and
  in response to determining that the time of day of the new context does not match the time of day data in the data set, cause the one or more processors to perform one or more operations comprising:
    modifying the computer search to include the inferred taste preference;
    modifying a timing of the computer search operation; and
    modifying an order of display of the second set of search results.

15. The system of claim 14, wherein the instructions, when executed by the one or more processors, cause the one or more processors to perform operations comprising, in response to determining that the time of day of the new context does not match the time of day data in the data set, generating an automated recommendation comprising restaurant data or menu item data matching the inferred taste preference and associated with the time of day of the new context.

16. The system of claim 10, wherein the instructions, when executed by the one or more processors, cause the one or more processors to perform operations comprising:
  detecting the new context by comparing a date of the new context to date data in the data set;
  determining that the date of the new context does not match the date data in the data set, and
  in response to determining that the date of the new context does not match the date data in the data set, cause the one or more processors to perform one or more operations comprising:
    modifying the computer search to include the inferred taste preference;
    modifying a timing of the computer search; and
    modifying an order of display of the second set of search results.

17. The system of claim 16, wherein the instructions, when executed by the one or more processors, cause the one or more processors to perform operations comprising, in response to determining that the date of the new context does not match the date data in the data set, generating an automated recommendation comprising restaurant data or menu item data matching the inferred taste preference and associated with the date of the new context.

18. The system of claim 10, wherein the label is indicative of a category of restaurants or a category of menu items or a category of food or a food-related restriction.

19. The system of claim 18, wherein configuring the computer operation comprises using the label to filter search results or including the label in a search query or using the label to arrange content on a display device.

20. A computer program product for providing improved search and retrieval of made-to-order menu item data in a computing device that is communicatively coupled to a food ordering computer system, the computer program product comprising one or more non-transitory computer readable storage media storing instructions which, when executed by one or more processors, cause the one or more processors to perform operations comprising:
  determining a computer account identifier for a user account associated with the computing device;
  storing, in a food provider system, food provider data for a plurality of food providers, wherein the food provider data for a food provider comprises information about the food provider and food order data comprising one or more food items corresponding to the food provider;
  assigning a plurality of labels to each food item in the food provider system, the plurality of labels comprising a dish, a dish category, a menu item, a menu item category and a restaurant class, wherein the plurality of labels comprise a food taxonomy;
  determining a data set, the data set comprising a plurality of instances of historical food order data linked with the computer account identifier, an instance of the plurality of instances is created as a result of an electronic activity associated with the food ordering computer system by the user account, the instance comprising a description of one or more food items and identifying at least a restaurant and a context of the electronic activity, the context comprising a time of day, a day of week, and a location of a food provider of the plurality of food providers, the data set comprising at least two instances that have different contexts;
  determining at least one food-related pattern for the user account by executing a pattern matching algorithm on the data set;
  determining an inferred taste preference for the user account by executing an inference algorithm on the at least one food-related pattern using the taxonomy;
  linking the inferred taste preference with the computer account identifier;
  in response to receiving a user input comprising a search term:
    using a signal from a sensor communicatively coupled to the computing device, detecting a new context associated with the computer account identifier;
    conducting a computer search for the search term in the food provider system, the computer search being performed based on the search term and corresponding to the new context;
    determining that a first set of search results based on the search term and corresponding to the new context is not represented in the food provider system;
    in response to determining that the first set of search results is not represented in the food provider system:
      configuring the computer search using a label selected from the plurality of labels as a parameter;
      modifying an output specification to display a second set of search results based on the selected label and the new context; and
    causing executing of a computer operation using the food ordering computer system.

21. The computer program product of claim 20, wherein the instructions, when executed by the one or more processors, cause the one or more processors to perform operations comprising extracting at least one of the instances of the food order data from web browsing activity data associated with the computer account identifier.

22. The computer program product of claim 20, wherein the instructions, when executed by the one or more processors, cause the one or more processors to perform operations comprising:
  detecting the new context by comparing a location of the new context to location data in the data set;
  determining that the location of the new context does not match the location data in the data set, and
  in response to determining that the location of the new context does not match the location data in the data set, cause the one or more processors to perform one or more operations comprising:
    modifying the computer search to include the inferred taste preference; and
    modifying an order of display of the second set of search results.

23. The computer program product of claim 22, wherein the instructions, when executed by the one or more processors, cause the one or more processors to perform operations comprising, in response to determining that the location of the new context does not match the location data in the data set, generating an automated recommendation comprising restaurant data or menu item data matching the taste preference and associated with the location of the new context.

24. The computer program product of claim 20, wherein the instructions, when executed by the one or more processors, cause the one or more processors to perform operations comprising:
  detecting the new context by comparing a time of day of the new context to time of day data in the data set;
  determining that the time of day of the new context does not match the time of day data in the data set, and
  in response to determining that the time of day of the new context does not match the time of day data in the data set, cause the one or more processors to perform one or more operations comprising:
    modifying the computer search to include the inferred taste preference;
    modifying a timing of the computer search; and
    modifying an order of display of the second set of search results.

25. The computer program product of claim 14, wherein the instructions, when executed by the one or more processors, cause the one or more processors to perform operations comprising, in response to determining that the time of day of the new context does not match the time of day data in the data set, generating an automated recommendation comprising restaurant data or menu item data matching the taste preference and associated with the time of day of the new context.

26. The computer program product of claim 20, wherein the instructions, when executed by the one or more processors, cause the one or more processors to perform operations comprising:
- detecting the new context by comparing a date of the new context to date data in the data set;
- determining that the date of the new context does not match the date data in the data set, and
- in response to determining that the date of the new context does not match the date data in the data set, cause the one or more processors to perform one or more operations comprising:
- modifying the computer search to include the inferred taste preference;
- modifying a timing of the computer search; and
- modifying an order of display of the second set of search results.

27. The computer program product of claim 26, wherein the instructions, when executed by the one or more processors, cause the one or more processors to perform operations comprising, in response to determining that the date of the new context does not match the date data in the data set, generating an automated recommendation comprising restaurant data or menu item data matching the taste preference and associated with the date of the new context.

28. The computer program product of claim 20, wherein the label is indicative of a category of restaurants or a category of menu items or a category of food or a food-related restriction.

29. The computer program product of claim 28, wherein configuring the computer operation comprises using the label to filter search results or including the label in a search query or using the label to arrange content on a display device.

* * * * *